Feb. 6, 1951 H. W. SNYDER 2,540,837
WELDING TRANSFORMER CONTROL SYSTEM
Filed March 29, 1946

INVENTOR
Henry W. Snyder
BY
Didier Journeau
ATTORNEY

Patented Feb. 6, 1951

2,540,837

UNITED STATES PATENT OFFICE 2,540,837

WELDING TRANSFORMER CONTROL SYSTEM

Henry W. Snyder, West Allis, Wis., assignor to Allis-Chalmers Manufacturing Company, Milwaukee, Wis., a corporation of Delaware Application March 29, 1946, Serial No. 658,047

3 Claims. (Cl. 323—62)

1

This invention relates in general to improvements in control systems for welding transformers, and more particularly to means for reducing the voltage of a welding transformer while the transformer is not carrying load current.

The supply of alternating current to welding electrodes is frequently effected through a transformer having a secondary open circuit voltage of such magnitude as to constitute, under favorable circumstances, a substantial hazard to a human being touching both electrodes simultaneously. It is therefore desirable to energize the transformer at reduced voltage while the transformer is not carrying load current. For the latter purpose, it is advantageous from the point of view of simplicity and economy of equipment to energize the transformer at reduced voltage through the actuating coil of the switch serving for the direct connection of the transformer with the source upon engagement of the welding electrodes. The reduced voltage may be impressed on the welding transformer from the source through suitable transformer means, which may consist of an autotransformer of low cost as the welding transformer need not be insulated from the source. Contactor coils of standard construction may be utilized for the control of different types of welding transformers by suitably choosing the connections between the coil, the welding transformer and the autotransformer.

It is therefore an object of the present invention to provide an improved system for causing the open circuit voltage of a welding transformer to be reduced by simple and inexpensive means.

Another object of the present invention is to provide an improved system for reducing the open circuit voltage of a welding transformer which is adapted for the control of transformers supplied from sources of different voltages.

Another object of the present invention is to provide an improved system for reducing the open circuit voltage of a welding transformer which permits utilizing elements of standard construction for controlling different tyeps of welding transformers.

Figure 1:
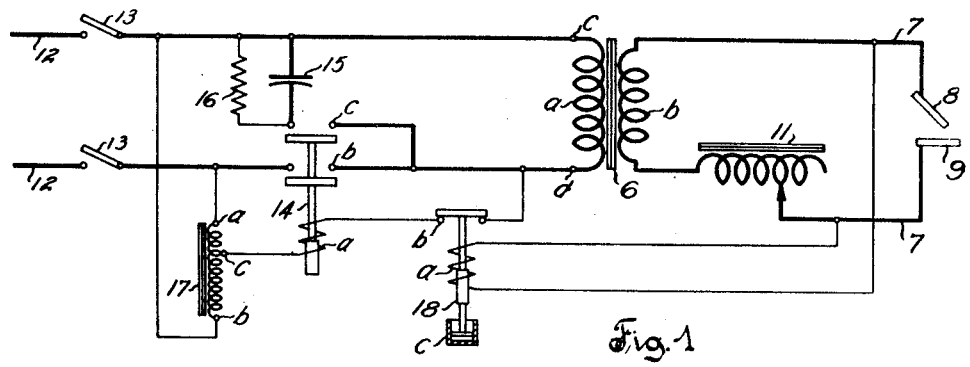
Figure 2:
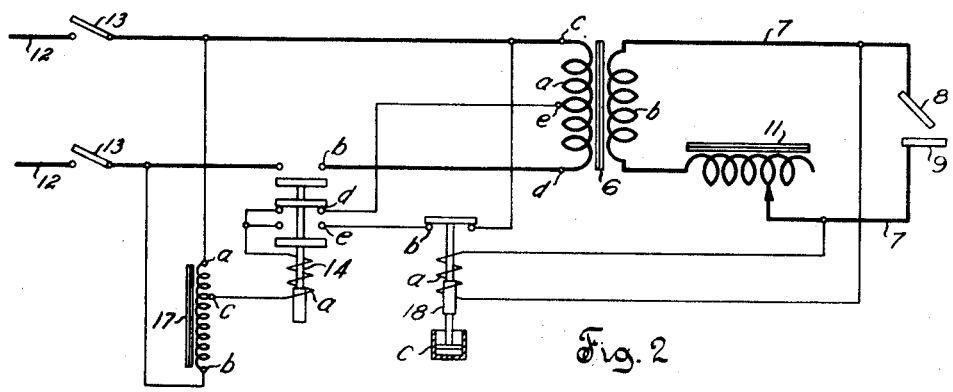

Objects and advantages other than those above set forth will be apparent from a consideration of the following description when read in connection with the accompanying drawing, in which:

Fig. 1 diagrammatically illustrates one embodiment of the present invention applied to the control of a welding transformer provided with an undivided primary winding;

Fig. 2 diagrammatically illustrates a modified embodiment of the present invention applied to

Figure 3:
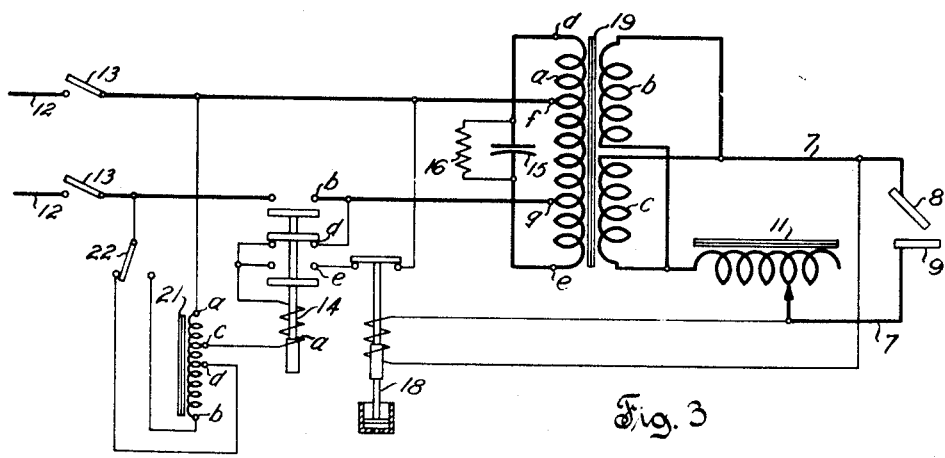

2 the control of the welding transformer provided with a tapped primary winding; and Fig. 3 diagrammatically illustrates another modified embodiment of the present invention applied to the control of a welding transformer provided with a primary winding adapted to be energized at voltages of different values.

Referring more particularly to the drawing by characters of reference, numeral 6 generally designates a welding transformer of any known type provided with a primary winding 6a and a secondary winding 6b. Winding 6b is connected with a welding circuit 7 for supplying current to a pair of welding electrodes 8, 9 of which electrode 8 is assumed to be a rod of weld metal and electrode 9 the work to be welded. The flow of current through electrodes 8, 9 is adjustably limited by causing the path of such flow of current to have a substantial variable impedance, as is well known. The latter result may be obtained by so disposing windings 6a, 6b as to cause the leakage reactance thereof to have a substantial value or by connecting winding 6b with circuit 7 through impedance means such as an adjustable reactor 11 of any suitable type.

Terminals 6c, 6d of winding 6a are to be connected with a suitable source of alternating current such as a circuit 12 energized from a suitable generator (not shown) through connections which may include disconnecting switches 13 and the main contacts 14b of a contactor switch 14. If it is desired to raise the power factor of the current supplied from circuit 12 to the system, switch 14 may be provided with further contacts 14c for connecting a capacitor 14 in parallel with winding 6a. A discharge resistor 16 may be connected across capacitor 15.

The actuating coil 14a of switch 14 may be energized from circuit 12 at reduced voltage through any suitable transformer means. No insulation, however, need be provided between coil 14a and circuit 12 and the transformer means may therefore advantageously be in the form of an autotransformer 17. The terminals 17a, 17b of the autotransformer are connected with circuit 12 through switches 13, and a fixed or adjustable tap 17c thereof is connected with terminal 6d through coil 14a and contacts 18b of a relay 18. The coil 18a of relay 18 is connected across circuit 7 to cause relay 18 to open contacts 18b in response to rise of the voltage of circuit 7 to a value substantially in excess of the value thereof resulting from establishment of an arc between electrodes 8, 9. The speed of operation of relay 18 may be established at any desired value by proper choice of the relay elements, which may include any suitable known delaying means conventionally represented as a dashpot 18c.

In operation, circuit 12 being energized and switches 13 being closed, the full voltage of circuit 12 is impressed across terminals 17a, 17b. A reduced voltage at value depending upon the choice of tap 17c is then impressed from the autotransformer on the circuit extending from tap 17c through coil 14a, contacts 18b and winding 6a to terminal 17b. The flow of current through winding 6a causes winding 6b to impress a predetermined reduced voltage on electrodes 8, 9. Tap 17c and the impedance of coil 14a are so chosen that the flow of current through the coil is insufficient to cause switch 14 to close its contacts and that the voltage appearing across the welding electrodes is of such low value as not to constitute a substantial hazard to human life. The electrode voltage is also insufficient to cause operation of relay 18.

Welding operation may be initiated by bringing electrode 8 in contact with electrode 9. A substantial current then flows through circuit 7, thereby causing the flow of current through coil 14a and winding 6a to increase to an extent sufficient to cause switch 14 to close the contacts thereof. Contacts 14b connect terminal 6d with circuit 12 to cause winding 6a to become energized at the full voltage of circuit 12. Coil 14a, however, remains energized at the proper voltage to maintain contacts 14b, 14c closed without overheating as a result of the connection of the coil between terminal 17a and tap 17c through contacts 18b and 14b. Contacts 14c connect capacitor 15 across circuit 12 to raise the power factor of the current supplied therefrom to the welding transformer. Electrodes 8, 9 may then be separated to draw a welding arc therebetween. The arc voltage is however insufficient to cause operation of relay 18, which remains in the position shown.

When the flow of current through winding 6b is interrupted by separation of electrodes 8, 9 beyond a predetermined distance, the voltage of circuit 7 abruptly increases to a predetermined value which may be considered to constitute a hazard to human life. After a predetermined time delay, relay 18 opens contacts 18b to deenergize coil 14a. Switch 14 returns to the position shown to disconnect terminal 6b from circuit 12. Contacts 18b being open, winding 6a is at first open circuited so that circuit 7 is deenergized and relay 18 returns to the position shown. Upon reclosure of contacts 18b, transformer 6 is again energized at reduced voltage and another welding operation may be initiated by engagement of electrodes 8, 9.

In the embodiment illustrated in Fig. 2, winding 6a is assumed to be provided with an intermediate terminal or tap 6e. While no power factor correction capacitor is shown in Fig. 2 it will be understood that such capacitor may be connected between terminals 6c, 6d either directly or through suitable contacts of switch 14. Coil 14a may be connected either with terminal 6e or with terminal 6d to obtain impression of the desired reduced voltage on winding 6a through coil 14a and to cause the current of coil 14a to assume the desired values when circuit 7 is open circuited and short circuited. To permit a greater latitude in the choice of coil 14a and of tap 17c, coil 14a is connected with terminal 6e through contacts 14d of switch 14 when the switch is in the position shown and the coil is connected with terminal 6c through contacts 14e, 18b when the switch is actuated.

The operation of the embodiment illustrated in Fig. 2 is generally similar to that of the embodiment illustrated in Fig. 1. When switch 14 is actuated, however, contacts 14d open to disconnect coil 14a from terminal 6e and contacts 14e close to reconnect coil 14a with terminal 6c through contacts 18b. The current of coil 14a may thus be maintained more easily within the ranges of value resulting in operation or non-operation of switch 14 in response to short circuiting or open circuiting of circuit 7.

In the embodiment illustrated in Fig. 3, welding circuit 7 is assumed to be energized from a transformer 19 adapted to be supplied from circuits operating at different voltages. Transformer 19 is provided with a primary winding 19a associated with two parallel secondary windings 19b, 19c. Winding 19a is provided with a plurality of terminals 19d, 19e, 19f and 19g. Circuit 12 may be connected between terminals 19f, 19g or between terminals 19d, 19e depending on the value of the voltage of circuit 12. Capacitor 15 is preferably connected between terminals 19d, 19e to obtain full utilization of the capacitor rating.

Autotransformer 17 is replaced by an autotransformer 21 provided with an additional tap 21d. A selector switch permits connecting circuit 12 between terminals 21a, 21b or between terminal 21a and tap 21d depending upon the voltage of circuit 12. Coil 14a may be connected through contacts 14d with any of terminals 19d, 19e, 19g depending upon the amount of current required for energizing transformer 19 at reduced voltage and upon the amount of current required for causing operation of switch 14. The voltage of portion a—c of autotransformer 21 is thus impressed on a selected portion of winding 19a to cause energization of circuit 7 at reduced voltage. The operation of the embodiment illustrated in Fig. 3 is otherwise identical to that of the embodiment illustrated in Fig. 2.

Although but a few embodiments of the present invention have been illustrated and described, it will be apparent to one skilled in the art that various changes and modifications may be made therein without departing from the spirit of the invention or from the scope of the appended claims.

It is claimed and desired to secure by Letters Patent:

1. In a control system for a welding transformer comprising a primary winding provided with first and second terminals to be connected to a source of alternating current and a secondary winding having a normal open circuit voltage of dangerously high value connected to a welding circuit, the combination of transformer means connected with said source and impressed with the voltage thereof to produce a reduced voltage, a connection joining said first terminal with said source and said transformer means, a switch for connecting said second terminal with said source, said switch being provided with an actuating coil, a connection between said second terminal and said transformer means through said coil to impress said reduced voltage between said terminals to cause the open circuit voltage of said secondary winding to be reduced to a predetermined value and cause closure of said switch in response to short circuiting of said welding circuit, and means responsive to closing operation of said switch for disconnecting said coil from said second terminal and reconnecting said coil with said first terminal.

2. In a control system for a welding transformer comprising a primary winding provided with first and second terminals to be connected to a source of alternating current and a secondary winding having a normal open circuit voltage of dangerously high value connected to a welding circuit, the combination of transformer means connected with said source and impressed with the voltage thereof to produce a reduced voltage, a connection joining said first terminal with said source and said transformer means, a switch for connecting said second terminal with said source, said switch being provided with an actuating coil, a connection between said second terminal and said transformer means through said coil to impress said reduced voltage between said terminals to cause the open circuit voltage of said secondary winding to be reduced to a predetermined value and cause closure of said switch in response to short circuiting of said welding circuit, means responsive to closing operation of said switch for disconnecting said coil from said second terminal and reconnecting said coil with said first terminal, and a relay provided with a coil connected with said welding circuit responsive to rise of the voltage of said welding circuit above said predetermined value for opening said connection between said transformer means and said first terminal through said coil.

3. In a control system for a welding transformer comprising a primary winding provided with a plurality of terminals, certain of said terminals to be connected to a source of alternating current, and a secondary winding having a normal open circuit voltage of a dangerously high value connected to a welding circuit, the combination of an autotransformer connected with said source and having a reduced voltage tap, means joining a first said terminal with said autotransformer and with said source, a switch for connecting a second said terminal with said source, said switch being provided with an actuating coil, a connection between said tap and one of said terminals other than said first terminal through said coil to impress said reduced voltage on a predetermined portion of said primary winding to cause the open circuit voltage of said secondary winding to be reduced to a predetermined value and cause closure of said switch in response to short circuiting of said welding circuit, and means responsive to operation of said switch for opening said connection through said coil and for reconnecting said tap with said first terminal through said coil.

HENRY W. SNYDER.

REFERENCES CITED

The following references are of record in the file of this patent:

UNITED STATES PATENTS

| Number | Name | Date |
| --- | --- | --- |
| 2,112,716 | Smith | Mar. 29, 1938 |
| 2,189,606 | King | Feb. 6, 1940 |
| 2,315,625 | King | Apr. 6, 1943 |
| 2,364,372 | Kenrick | Dec. 5, 1944 |

FOREIGN PATENTS

| Number | Country | Date |
| --- | --- | --- |
| 749,634 | France | May 8, 1933 |